United States Patent Office 2,913,453
Patented Nov. 17, 1959

2,913,453
N-CARBOXYLATES OF AMINO 1,4-QUINONES

Siegfried Petersen and Walter Gauss, Leverkusen-Bayerwerk, Leverkusen, and Gerhard Domagk, Wuppertal-Elberfield, Germany, assignors to Schenley Industries, Inc., New York, N.Y., a corporation of Delaware No Drawing. Application April 3, 1958
Serial No. 726,060

Claims priority, application Germany April 5, 1957

6 Claims. (Cl. 260—239)

This invention relates generally to the preparation of certain novel dyestuffs that, because of their solubility in organic solvents, make them especially useful for imparting color to synthetic fibres, particularly polyacrylonitrile fibres and for the dyeing of films, coatings, varnishes and the like made from cellulose esters, cellulose nitrate or the like.

Prior to the advent of widespread use of synthetic fibres, it was customary to impart color to fibres of natural origin by means of water soluble coloring agents which, through various means, were fixed in the fibre. However, the new synthetic fibres are not responsive to coloring by this method and it is necessary therefore to utilize coloring agents soluble in organic solvents such as the lower alkanols, dimethylformamide, chlorinated hydrocarbons or the like. The present invention is addressed to providing novel dyestuffs of the aforementioned type.

In accordance with this invention, it is now found that 1,4-quinones which may be either benzoquinones or naphthaquinones, having a halogen atom as a substituent in the 2-position and a substituent in the 3-position of the form —N(COOR)$_2$ or of the form

—N(COOR)COR wherein R is a lower alkyl group, may be reacted with primary and secondary amines whereby the amino residue is introduced into the 2-position as a substituent group. Among the quinones that may be employed in preparation of the products according to this invention are included the following:

2,5 - dichloro - 3,6 - diamino-1,4-benzoquinone-diethyl N,N'-dicarboxylate;
2 - chloro - 3 - amino-1,4-naphthoquinone-ethyl-N-carboxylate;
2 - chloro-3-amino-1,4-naphthoquinone-methyl N-carboxylate;
2-chloro-3-amino-1,4-naphthoquinone-diethyl N,N-dicarboxylate;
2-chloro-3-methylamino-1,4-naphthoquinone-ethyl N-carboxylate and generally
2-chloro-3-alkylamino-1,4-naphthoquinone-alkyl N-carboxylate;
2-chloro-3-acetylamino-1,4-naphthoquinone methyl N-carboxylate;
2 - chloro-3-acetylamino-1,4-naphthoquinone-ethyl N-carboxylate and generally
2-chloro-3-aliph. acylamino-1,4-naphthoquinone-alkyl N-carboxylate; and
7 - chloro - 6-amino-5,8-quinolinequinone-ethyl-N-carboxylate.

A wide range of primary and secondary amines may be utilized in practice of this invention. Examples of primary amines are methylamine, ethylamine, propylamine, butylamine, stearylamine, aniline, benzylamine and cyclohexylamine. Examples of suitable secondary amines are dimethylamine, diethylamine, dipropylamine, methylethylamine, methylpropylamine, and N-methylaniline. The two substituents in secondary amines may also be cyclized or interlinked through a hetero atom, as e.g. in ethylene imine, 2-methylethyline imine, 2,2-dimethylethylene imine, pyrrolidine, piperidine, morpholine, piperazine, and N-methylpiperazine.

The reactions of the amines with the quinone derivatives, the reactive halogen of which is to be exchanged for a base radical, had best be carried out in solvents or diluents. Since the halogen is split off in the form of hydrogen halide, it proves advisable to use at least 2 moles of the amine per halogen atom in order to provide hydrohalic acid acceptor. The reactions generally proceed spontaneously with evolution of heat; where this is not the case, mild heating is sufficient. If a proper diluent has been chosen, the new quinone derivative will crystallize directly from the reaction mixture in the course or at the end of the reaction, while the amine hydrohalide remains in solution. The lower alcohols often serve this purpose.

If the amine used in the process is sensitive to hydrohalic acids, as is true of alpha,beta-alkylene imines, for example, a tertiary base such as triethylamine should be added to the reaction mixture as acid acceptor. Benzene hydrocarbons have been found satisfactory as diluents for such reactions; they also facilitate separation of the trialkylamine hydrohalides.

The new quinone derivatives are colored solid compounds which can be purified by recrystallization or reprecipitation, after which they show defined melting or decomposition points.

As has been mentioned above, these novel dyestuffs are readily soluble in organic solvents, notably in the lower alkanols, dimethylformamide, chlorinated hydrocarbons, and the like, and they may be used successfully in dyeing such synthetic fibres as those produced from polyacrylonitrile, cellulose acetate, cellulose nitrate and cellulose acetopropionate, to mention merely a few of the synthetic fibres that readily may be dyed or colored with these novel products. The relative insolubility of these compounds in water results in a coloring agent that is resistant to ordinary laundering operations.

The aforementioned types of dyestuffs are readily obtained by reaction of suitably selected 1,4-quinones which may be either benzoquinones or naphthoquinones, bearing a halogen atom as a substituent in both the 2 and 3-positions with suitably selected alkali compounds of carbamic acid esters that may be either monosubstituted at the nitrogen atom or which may be unsubstituted at this position. With monosubstituted alkali compounds of carbamic acid esters, the desired reaction products are obtained by reaction of substantially equal molecular proportions of the reactants, whereas if unsubstituted compounds are employed, alkali compounds of the quinone urethans will be produced from which the desired final products are obtainable upon acidification of the reaction mixture. These alkali compounds of the quinone urethans, it is to be noted, are subject to ready alkylation, for instance by use of an alkyl halide, acylation, as by reaction with a suitably selected organic acid anhydride or organic acid halide, or the like.

Among the haloquinones that may be utilized in this reaction are the following: Monochloro-1,4-benzoquinone, 2,3-dichloro-1,4-benzoquinone, 2,5-dichloro-1,4-benzoquinone, 2,6-dichloro-1,4-benzoquinone, trichloro-1,4-benzoquinone, chloranil, 2,5-dimethyl-3,6-dichloro-1,4-benzoquinone, 2,5-dimethyl-3,6-dibromo-1,4-benzoquinone, trichloro-1,4-toluquinone, bromanil, etc.

The following halogen derivatives from the p-naphthoquinone series, for example, may be employed in the present process: 2-chloro-1,4-naphthoquinone, 2-methyl-3-chloro-1,4-naphthoquinone, 2,3-dichloro-1,4-naphthoquinone, 2,3-dibromo-1,4-naphthoquinone, etc.

Halogenated o-quinones, too, may be used, examples being tetrachloro-1,2-benzoquinone and 3,4-dichloro-1,2-naphthoquinones. Just as successful is the use of quinones of heterocyclic compounds that are halogenated in the quinone nucleus.

Haloquinones which contain other substituents in the quinone nucleus besides reactive halogen are likewise suitable.

The reactible alkali compounds of urethans can be represented by this general formula:

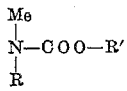

In this formula Me represents an alkali metal, i.e., lithium, sodium or potassium, for example, while R may be hydrogen, alkyl or aryl, and R' stands for an aliphatic or aromatic radical. The general formula has to be appropriately modified if R or R' represents a bifunctional radical. Alkali compounds of the following specific carbamic acid esters may be mentioned: urethylan and urethan, propyl, butyl and phenyl carbamate, glycol bis-carbamate, as well as methylcarbamic esters, ethylcarbamic esters, butylcarbamic esters, phenylcarbamic esters, and hexamethylene-bis-carbamic esters, esters with a wide variety of hydroxyl compounds being included and only the high-molecular weight polyurethans excepted.

The haloquinones had best be reacted with these sodium compounds in an inert solvent such as benzene or toluene. Alcohols, too, may serve as solvents. The reaction temperature should be as low as possible, ranging e.g. from 0° C. to the boiling temperature of the solvent.

As previously mentioned, use of the alkali compounds of N-unsubstituted carbamic esters leads first of all to alkali compounds of the condensates. These are for the most part dark, reddish-brown, purplish-brown or black compounds. The corresponding free aminoquinone urethans are obtained by acidification with acetic acid or mineral acids.

The crude alkali salts may find application for the aforementioned further reactions with alkylating or acylating agents. Examples of the former are methyl iodide, ethyl bromide, benzyl chloride, ethylene bromide and many more. Acid anhydrides and acid halides are particularly suitable for acylation. Among acid chlorides, esters of chloroformic acid in particular should be mentioned; these lead to aminoquinone-N,N-dicarboxylic acid esters.

These new quinones having urethan substituents in the 4-position and a halogen substituent in the 2-position have the common utility of being useful as intermediates in the synthesis of valuable new dyestuffs as above mentioned.

To facilitate a fuller and more complete understanding of the subject matter of this invention and of the manner wherein the same best may be practiced, certain specific examples herewith follow. It is clearly to be understood, however, that these examples are provided by way of illustration merely and are not to be construed as imposing any limitations upon the inventions defined in the subjoined claims.

EXAMPLE 1

Synthesis of 2-chloro-3-amino-1,4-naphthoquinone-ethyl N-carboxylate

About 23 grams of sodium wire is added to a solution of 87 grams of urethan in 600 cubic centimeters of benzene. While hydrogen evolves, a white suspension of urethan sodium is formed. The batch is allowed to stand for 12 hours and is then mixed incrementally, while vigorously stirring, with a suspension of approximately 100 grams of 2,3-dichloro-1,4-naphthoquinone in 300 cubic centimeters of benzene. The temperature then rises from 20° C. to about 35°–40° C., and a dark precipitate immediately forms. After 2 hours this is filtered under suction and the residue is washed with benzene and ether. This black-red solid is stirred up in 600 cubic centimeters of ethanol, acidified with 160 cubic centimeters of glacial acetic acid, and the mixture is filtered. The residue is recrystallized from ethanol, insoluble components being removed by filtration of the hot solution. The desired reaction product, 2-chloro-3-amino-1,4-naphthoquinone-ethyl N-carboxylate, precipitates in yellow needles.

Yield: 60–70 grams. Melting point: 145.0°–146.5° C. $C_{13}H_{10}O_4NCl$ (279.68). Calculated: N, 5.01; Cl, 12.68. Found: N, 5.11; Cl, 12.75. This reaction product is an intermediate useful in production of dyestuffs as will be hereinafter explained.

EXAMPLE 2

Synthesis of 2-chloro-3-amino-1,4-naphthoquinone-methyl N-carboxylate

About 23 grams of sodium pellets are added to a solution of 75 grams of methyl carbamate (urethylan) in 500 cubic centimeters of benzene, and the mixture is stirred until all metallic sodium has disappeared. At room temperature, approximately 100 grams of finely powdered 2,3-dichloro-1,4-naphthoquinone, suspended in 300 cubic centimeters of benzene, is added. The temperature now rises with immediate formation of a dark precipitate, which is removed after 90 minutes by filtration.

The filter cake is taken up with 500 cubic centimeters of toluene, acidified with glacial acetic acid and then filtered while hot. Yellow crystals precipitate from the filtrate; these are recrystallized from toluene with added animal charcoal. The resultant reaction product, 2-chloro-3-amino-1,4-naphthoquinone-methyl N-carboxylate, melts at 154°–155° C.

$C_{12}H_8O_4NCl$ (263.65). Calculated: C, 54.69; H, 3.06; N, 5.31; Cl, 13.45. Found: C, 54.56; H, 3.43; N, 5.22; Cl, 13.00. This reaction product is an intermediate useful in production of dyestuffs as will be hereinafter explained.

EXAMPLE 3

Synthesis of 2-chlor-3-acetylamino-1,4-naphthoquinone-methyl N-carboxylate

About 100 cubic centimeters of acetic anhydride is added to a suspension of the sodium compound of 2-chloro-3-amino-1,4-naphthoquinone-methyl N-carboxylate in benzene prepared as described in Example 2 (from 23 grams sodium and 75 grams urethylan), followed by filtration. The residue is twice extracted by boiling with toluene. Light-yellow crystals precipitate from the collected filtrates; upon recrystallization from chlorobenzene they melt at 216°–218° C. According to elementary analysis, this reaction product is 2-chloro-3-acetylamino-1,4-naphthoquinone-methyl N-carboxylate:

$C_{14}H_{10}O_5NCl$ (307.69). Calculated: C, 54.65; H, 3.32; N, 4.55; Cl, 11.52. Found: C, 54.60; H, 3.50; N, 4.50; Cl, 11.35. This reaction product is an intermediate useful in production of dyestuffs as will be hereinafter explained.

EXAMPLE 4

Synthesis of 2-chloro-3-acetylamino-1,4-naphthoquinone-ethyl N-carboxylate

The procedure described in Example 3 is repeated, substituting a stoichiometric equivalent of urethan for the urethylan, whereby the corresponding acetyl compound is obtained as yellow crystals from wash benzene or glycol monomethyl ether acetate, melting at 165°–167° C., from a suspension of the sodium compound of 2-chloro-3-amino-1,4-naphthoquinone-ethyl N-carboxylate.

$C_{15}H_{12}O_5NCl$ (321.72). Calculated: C, 55.98; H, 3.76; Cl, 11.03. Found: C, 55.95; H, 3.95; Cl, 10.97. This reaction product is an intermediate useful in production of dyestuffs as will be hereinafter explained.

EXAMPLE 5

Synthesis of 2-chloro-3-amino-1,4-naphthoquinone-diethyl N,N-dicarboxylate

A benzene suspension of the sodium compound of 2-chloro-3-amino-1,4-naphthoquinone-ethyl N-carboxylate prepared according to Example 1 is mixed dropwise, while stirring, with 50 grams of ethyl chloroformate, causing the temperature of the mixture to rise from 20° C. to 28° C. The mixture is heated at its boiling point for half an hour and is then filtered while hot. The clear filtrate is evaporated in vacuo, and the crystalline residue (72 grams) is separated by filtration in a filter press and then recrystallized first from wash benzene and subsequently from methanol. The reaction product so obtained, 2-chloro-3-amino-1,4-naphthoquinone-diethyl N,N-dicarboxylate, melts at 148°–150° C.

$C_{16}H_{14}O_6NCl$ (351.74). Calculated: C, 54.63; H, 4.01; N, 10.08. Found: C, 54.98; H, 4.22; N, 10.10. This reaction product is useful as an intermediate in production of dyestuffs as will be explained hereinafter.

EXAMPLE 6

Synthesis of 2-chloro-3-amino-1,4-naphthoquinone-dimethyl N,N-dicarboxylate

The procedure described in Example 5 is repeated, substituting a stoichiometric equivalent of 2-chloro-3-amino-1,4-naphthoquinone-methyl N-carboxylate for the 2-chloro-3-amino-1,4-naphthoquinone-ethyl N-carboxylate and a stoichiometric equivalent of methyl chloroformate for the ethyl chloroformate there employed. The reaction product so obtained, 2-chloro-3-amino-1,4-naphthoquinone-dimethyl N,N-dicarboxylate, when recrystallized from methanol, melts at 188°–190° C.

$C_{14}H_{10}O_6NCl$. Calculated: C, 51.96; H, 3.12; N, 4.30. Found: C, 52.01; H, 3.07; N, 4.44. This reaction product is useful as an intermediate in production of dyestuffs as will be explained hereinafter.

EXAMPLE 7

Synthesis of 2,5-dichloro-3,6-diamino-1,4-benzoquinone-diethyl N,N'-dicarboxylate About 30.7 grams (0.125 mole) of chloranil is added all at once to a suspension of urethan sodium prepared from 44.5 grams (0.5 mole) of ethyl carbamate, 300 cubic centimeters of benzene, and 11.5 grams (0.5 mole) of sodium wire, and the mixture is stirred overnight at 25°–30° C. The dark reaction mixture is then filtered under suction, and the cake is washed with benzene and the wash liquid is filtered off by pressure as far as possible. The residue is subsequently stirred into a mixture of 250 cubic centimeters of water and 30 cubic centimeters of glacial acetic acid, allowed to stand in ice for some time, and then suction-filtered. The viscid residue is leached out with cold methanol, so that a tan-colored powder having a melting point of 217.0°–228.5° C. is obtained. Twofold recrystallization of this product from ethyl acetate yields pure 2,5-dichloro-3,6-diamino-1,4-benzoquinone-diethyl N,N'-dicarboxylate in the form of orange-colored needles that melt at 220°–223° C. For purposes of analysis, the compound was dried in vacuo at 75° C. over phosphorus pentoxide.

$C_{12}H_{12}Cl_2N_2O_6$ (351.02). Calculated: C, 41.02; H, 3.45; Cl, 20.20; N, 7.98; O, 27.35. Found: C, 40.85, 40.87; H, 3.20, 3.44; Cl, 19.95; N, 7.36, 7.42; O, 27.28, 27.00. This reaction product is useful as an intermediate in synthesis of dyestuffs as will be hereinafter explained.

It will be noticed that each of the reaction products described in the foregoing Examples 1 through 7 is a 2-chloro-3-amino-1,4-quinone-lower alkyl N-carboxylate. The 2-position chloro substituents of these compounds are readily replaceable by amino radicals (cf. Le A 4107) yielding dyestuffs which are soluble in organic solvents and which are therefore useful for the dyeing of synthetic fibres, especially polyacrylonitrile fibres, and for the dyeing of films, coatings, varnishes and the like, made from cellulose nitrate, cellulose acetate or cellulose acetopropionate. The manner whereby these valuable new dyestuffs may be obtained will now be described.

EXAMPLE 8

Synthesis of 2,5-bis-aziridino-3,6-diamino-1,4-benzoquinone-diethyl N,N'-dicarboxylate About 5.2 cubic centimeters (0.1 mole) of aziridine, diluted with 10 cubic centimeters of benzene is instilled with stirring into a mixture consisting of 13.3 grams (0.038 mole) of 2,5-dichloro-3,6-diamino-1,4-benzoquinone-diethyl N,N'-dicarboxylate (which may be prepared as described in Example 7 supra), 100 cubic centimeters of benzene, and 12.5 cubic centimeters (0.09 mole) of triethylamine; stirring is then continued at 25° C. for 6 hours. On the following day the reddish-brown suspension is filtered off by vacuum, and the residue is washed first with benzene, then thoroughly with water, and allowed to dry. Obtained is 10.6 grams of 2,5-bis-aziridino-3,6-diamino-1,4-benzoquinone-diethyl N,N'-dicarboxylate, which is recrystallized from 500 cubic centimeters of ethanol. The product thus purified (7.4 grams) consists of loose, yellowish-brown crystals which decompose at temperatures above 250° C.

$C_{16}H_{20}N_4O_6$ (364.35). Calculated: C, 52.74; H, 5.53; N, 15.35; O, 26.35. Found: C, 52.99, 53.08; H, 5.59, 5.72; N, 14.27, 14.50; O, 26.75.

EXAMPLE 9

Synthesis of 2-aziridino-3-amino-1,4-naphthoquinone-methyl N-carboxylate

A mixture consisting of 17.0 grams (0.064 mole) of 2-chloro-3-amino-1,4-naphthoquinone-methyl N-carboxylate (which may be prepared as described in Example 2, supra), 100 cubic centimeters of benzene, 12.3 cubic centimeters (0.88 mole) of triethylamine, and 8 cubic centimeters of aziridine is stirred at room temperature for about 10 hours. On the following day the batch is suction-filtered and washed with benzene; the triethylamine hydrochloride is dissolved out of the residue by means of water. The dried 2-aziridino-3-amino-1,4-naphthoquinone-methyl N-carboxylate (10.5 grams) forms an orange crystal powder that, when heated, is found to have a decomposition point of 174°–175° C. The decomposition point does not change upon recrystallization from methanol.

$C_{14}H_{12}N_2O_4$ (272.25). Calculated: C, 62.76; H, 4.44; N, 10.29. Found: C, 61.00, 61.10; H. 4.25, 4.54; N, 9.48, 9.65.

EXAMPLE 10

Synthesis of 2-cyclohexylamino-3-amino-1,4-naphthoquinone-methyl N-carboxylate About 12.7 grams (0.05 mole) of 2-chloro-3-amino-1,4-naphthoquinone-methyl N-carboxylate (which may be prepared as described in Example 2, supra) is stirred into a solution of 11 grams of cyclohexylamine in 100 cubic centimeters of alcohol. The yellow starting material darkens and changes without completely dissolving. After heating at the boiling point of the mixture of 2 hours, the solution is clear and then is filtered. Cooling yields orange-red crystals, which are recrystallized from a small quantity of alcohol. The well-crystallized reaction product, 2-cyclohexylamino-3-amino-1,4-naphthoquinone-methyl N-carboxylate, melts unsharply near 130° C.

$C_{18}H_{20}O_4N_2$ (328.26). Calculated: C, 65.84; H, 6.14. Found: C, 65.92; H, 6.21.

EXAMPLE 11

*Synthesis of 2-dimethylamino-3-amino-1,4-naphtho-quinone-ethyl N-carboxylate*

About 10 grams of a 53% aqueous dimethylamine solution is diluted with 100 cubic centimeters of ethanol. Into this mixture is stirred 14 grams (0.05 mole) of 2-chloro-3-amino-1,4-naphthoquinone-ethyl N-carboxylate (which may be prepared as described in Example 1, supra), which soon dissolves yielding a solution having a blood-red color. The temperature rises to 40° C., and the reaction product, 2-dimethylamino-3-amino-1,4-naphthoquinone-ethyl N-carboxylate, precipitates in the form of purplish-brown, lustrous crystals. These are filtered off by suction, washed with alcohol and water, and purified by recrystallization from a 50% aqueous ethanol. They melt on the Kofler heating block at 93° C. Yield: about 11 grams.

$C_{15}H_{16}O_4N_2$ (288.33). Calculated: C, 62.51; H, 5.60. Found: C, 62.50; H, 5.65.

EXAMPLE 12

*Synthesis of 2-dimethylaminopropylamino-3-amino-1,4-naphthoquinone-ethyl N-carboxylate*

The process described in Example 11 is repeated in an analogous manner using, instead of 10 grams of the aqueous dimethylamine solution, 12 grams of 1-dimethylamino-3-aminopropane in 100 milliliters of ethanol. The desired reaction product, 2-dimethylaminopropylamino-3-amino-1,4-naphthoquinone-ethyl N-carboxylate, is obtained as dark-red crystals which can be dissolved in ethanol, dimethylformamide or in chlorinated hydrocarbons to yield solutions of a blood-red coloration. These solutions are capable of dyeing polyacrylonitrile fibres in dark red tints.

EXAMPLE 13

*Synthesis of 2-aziridino-3-amino-1,4-naphthoquinone-ethyl N-carboxylate*

A mixture consisting of 25.2 grams (0.09 mole) of 2-chloro-3-amino-1,4-naphthoquinone-ethyl N-carboxylate (which may be prepared as described in Example 1, supra), 200 cubic centimeters of benzene, 16.7 cubic centimeters (0.12 mole) of triethylamine, and 11.6 cubic centimeters (0.22 mole) of aziridine is stirred at room temperature for 10 hours. On the next day the product is filtered off, and the residue washed successively with benzene and water, and allowed to dry, giving about 11.9 grams of crude 2-aziridino-3-amino-1,4-naphthoquinone-ethyl N-carboxylate which, when heated, is found to have the decomposition point 171° C. An additional amount of the crude product (5.1 grams, decomposition point 171° C.) is obtained by evaporation of the benzene filtrates in vacuo and digestion of the residue with methanol. A single recrystallization from 170 cubic centimeters of ethyl acetate is sufficient for purification, about 12.9 grams of an orange-colored product with a decomposition point of 174°–175° C. being obtained.

$C_{15}H_{14}N_2O_4$ (286.28). Calculated: C, 62.93; H, 4.93; N, 9.79; O, 22.36. Found: C, 62.99, 63.21; H, 5.07, 5.08; N, 9.63; O, 22.80, 22.82.

EXAMPLE 14

*Synthesis of 2-(2'methylaziridino)-3 amino-1,4-naphthoquinone-ethyl N-carboxylate*

A mixture consisting of 28.0 grams (0.1 mole) of 2-chloro-3-amino-1,4-naphthoquinone-ethyl N-carboxylate (which may be prepared as described in Example 1, supra), 200 cubic centimeters of benzene, 16.7 cubic centimeters (0.12 mole) of triethylamine, and 6.3 grams (0.11 mole) of 2-methyl-aziridine is stirred at room temperature overnight. Since not all the haloquinone reacts immediately, another 6.3 grams of 2-methyl-aziridine is added, and stirring is resumed for another 24 hours or so. Subsequently, the triethylamine hydrochloride is filtered off under suction, washed with benzene, and the filtrate is dried in vacuo. The residue is leached in the cold with a small quantity of ethanol. There remains about 22 grams of crude orange-colored reaction product, 2-(2'-methylaziridino)-3-amino-1,4-naphthoquinone-ethyl N-carboxylate, which melts at 138.5°–140.0° C. The melting point is not raised by redissolution in ethanol.

$C_{16}H_{16}N_2O_4$ (300.30). Calculated: C, 63.99; H, 5.37; N, 9.33; O, 21.31. Found: C, 63.49, 63.60; H, 5.24, 5.46; N, 8.92, 9.22; O, 21.43.

EXAMPLE 15

*Synthesis of 2-morpholino-3-amino-1,4-napthoquinone-ethyl N-carboxylate*

About 14 grams (0.05 mole) of 2-chloro-3-amino-1,4-naphthoquinone-ethyl N-carboxylate (which may be prepared as described in Example 1, supra), is stirred at room temperature into a solution of 10 grams of morpholine in 100 cubic centimeters of alcohol, followed by brief heating to 40° C. The temperature then rises to 50° C., and the components dissolve to yield a dark-red solution. The new compound, 2-morpholino-3-amino-1,4-naphthoquinone-ethyl N-carboxylate, precipitates after some time in the form of dark-red crystals; these are filtered off while solution is ice-cold and recrystallized from ethanol. Melting point: 151°–153° C., yield: about 13.3 grams.

$C_{17}H_{18}O_5N_2$ (330.33). Calculated: C, 61.81; H, 5.49; N, 8.48. Found: C, 61.70, 61.96; H, 5.55, 5.63; N, 8.63, 8.37.

EXAMPLE 16

*Synthesis of 2-piperidino-3-amino-1,4-naphthoquinone-ethyl N-carboxylate*

The procedure described in Example 15 is repeated except that the morpholine is replaced by a stoichiometrically equivalent amount of piperidine, 2-piperidino-3-amino-1,4-naphthoquinone-ethyl N-carboxylate, melting at 138°–139° C. and showing very similar properties, is obtained in a yield of about 15.5 grams.

$C_{18}H_{20}O_4N_2$ (328.36). Calculated: C, 65.84; H, 6.14; N, 8.54. Found: C, 65.64, 65.86; H, 6.14, 6.27; N, 8.79.

EXAMPLE 17

*Synthesis of 2-aziridino-3-amino-1,4-naphthoquinone-diethyl N,N'-dicarboxylate*

A mixture consisting of 16.3 grams of 2-chloro-3-amino-1,4-naphthoquinone-diethyl N,N'-dicarboxylate (which may be prepared as described in Example 5 supra), 100 cubic centimeters of benzene, 7 cubic centimeters of triethylamine, and 4.7 cubic centimeters of aziridine is stirred at 25° C. overnight. The triethylamine hydrochloride is then filtered off by suction and washed with benzene, and the filtrate is dried in vacuo. The residue (10.5 grams) is successively leached in the cold, first with ethanol and then with ethyl acetate, until the product appears pure-yellow. Subsequently, it is recrystalized from ethyl acetate, yielding the desired pure reaction product, 2-aziridino-3-amino-1,4-naphthoquinone-diethyl N,N-dicarboxylate, which melts at 157°–159° C.

$C_{18}H_{18}N_2O_6$ (358.34). Calculated: C, 60.33; H, 5.06; N, 7.82. Found: C, 60.59, 60.59; H, 5.16, 5.28; N, 7.50, 7.80.

EXAMPLE 18

*Synthesis of 2-morpholine-3-amino-1,4-naphthoquinone-diethyl N,N-dicarboxylate*

About 14 grams of 2-chloro-3-amino-1,4-naphthoqui-none-diethyl N,N-dicarboxylate (which may be prepared as described in Example 5 supra) (0.04 mole) is introduced at 27° C. into a solution of 9 grams of morpholine in 100 cubic centimeters of alcohol. Upon brief heating to 40° C. the compound goes into orange-red solution. The resultant reaction product, 2-morpholino-3-amino-1,4- naphthoquinone-diethyl N,N-dicarboxylate, begins to crystallize after about 10 minutes and is filtered off under vacuum while ice-cold. Recrystallization from alcohol yields about 12 grams of orange-colored crystals of melting point 138°–139° C.

$C_{20}H_{22}O_7N_2$ (402.39). Calculated: C, 59.69; H, 5.51; N, 6.96. Found: C, 59.68; H, 5.67; N, 6.78.

EXAMPLE 19

*Synthesis of 2-morpholino-3-acetylamino-1,4-naphthoquinone-ethyl N-carboxylate*

The procedure described in Example 18 is repeated except that instead of 2-chloro-3-amino-1,4-naphthoquinone-diethyl N,N-dicarboxylate, a stoichiometrically equivalent amount of 2-chloro-3-acetylamino-1,4-naphthoquinone-ethyl N-carboxylate (which may be prepared as described in Example 4 supra), is reacted with morpholine to give 2 - morpholino - 3 - acetylamino - 1,4 - naphthoquinone-ethyl N-carboxylate in the form of coarse red crystals which melt at 129°–130° C.

$C_{19}H_{20}O_6N_2$ (372.37). Calculated: C, 61.28; H, 5.41; N, 7.52. Found: C, 61.80; H, 5.38; N, 7.53.

EXAMPLE 20

*Synthesis of 2-anilino-3-amino-1,4-naphthoquinone-ethyl N-carboxylate*

A solution of 20 grams of aniline in 200 cubic centimeters of alcohol is mixed with 28 grams of 2-chloro-3-amino-1,4-naphthoquinone-ethyl N-carboxylate (which may be prepared as described in Example 1, supra), and this mixture is boiled under reflux for 1 hour. The clear, dark-red solution so obtained is cooled. The precipitating ruby-red crystals are washed with alcohol and water. The desired reaction product, 2-anilino-3-amino-1,4-naphthoquinone-ethyl N-carboxylate, is obtained in a yield of about 26 grams. For analysis it may be recrystallized from glycol monomethyl ether acetate, after which it melts at 176° C.

Having thus described the subject matter of this invention, what it is desired to secured by Letters Patent of the United States is:

1. As a new composition of matter, useful as an intermediate in synthesis of organic solvent soluble dyestuffs suited for dyeing of synthetic fibres, a compound selected from the group consisting of 2-chloro-3-amino-1,4-naphthoquinone-ethyl N-carboxylate, 2-chloro-3-amino-1,4-naphthoquinone-methyl N-carboxylate, 2-chloro-3-acetylamino - 1,4 - naphthoquinone - methyl N - carboxylate, 2 - chloro - 3 - acetylamino - 1,4 - naphthoquinone - ethyl N-carboxylate, 2-chloro-3-amino-1,4-naphthoquinone-diethyl N,N-dicarboxylate, 2-chloro-3-amino-1,4-naphthoquinone-dimethyl N,N-dicarboxylate and 2,5-dichloro-3,6-diamino-1,4-benzoquinone-diethyl N,N'-dicarboxylate.

2. As a new composition of matter, useful as an intermediate in synthesis of organic solvent soluble dyestuffs for dyeing of synthetic fibres, 2-chloro-3-amino-1,4-naphthoquinone-ethyl N-carboxylate.

3. As a new composition of matter, useful as an intermediate in synthesis of organic solvent soluble dyestuffs for dyeing of synthetic fibres, 2-chloro-3-amino-1,4-naphthoquinone-methyl N-carboxylate.

4. As a new composition of matter, a compound selected from the group consisting of 2,5-bis-aziridino-3,6-diamino-1,4-benzoquinone-diethyl N,N'-dicarboxylate, 2-aziridino - 3 - amino - 1,4 - naphthoquinone - methyl N-carboxylate, 2 - cyclohexylamino - 3 - amino - 1,4 - naphthoquinone-methyl N-carboxylate, 2-dimethylamino-3-amino-1,4-naphthoquinone-ethyl N-carboxylate, 2-dimethylaminopropylamino - 3 - amino - 1,4 - naphthoquinone-ethyl N-carboxylate, 2-aziridino-3-amino-1,4-naphthoquinone-ethyl N-carboxylate, 2-(2'-methylazirdino)-3-amino-1,4-naphthoquinone-ethyl N-carboxylate, 2-morpholino - 3 - amino - 1,4 - naphthoqninone - ethyl N - carboxylate, 2 - piperidino - 3 - amino - 1,4 - naphthoquinone - ethyl N - carboxylate, 2 - aziridino - 3 - amino-1,4-naphthoquinone-diethyl N,N-dicarboxylate, 2-morpholino - 3 - amino - 1,4 - naphthoquinone - diethyl N,N-dicarboxylate, 2 - morpholino - 3 - acetylamino - 1,4-naphthoquinone-ethyl N-carboxylate, and 2-anilino-3-amino-1,4-naphthoquinone-ethyl N-carboxylate.

5. As a new composition of matter, 2-aziridino-3-amino-1,4-naphthoquinone-methyl N-carboxylate.

6. As a new composition of matter, 2-aziridino-3-amino-1,4-naphthoquinone-ethyl N-carboxylate.

No references cited.